United States Patent [19]
Futschik et al.

[11] Patent Number: 5,927,790
[45] Date of Patent: Jul. 27, 1999

[54] MOTOR VEHICLE INSTRUMENT PANEL HAVING A TRIM STRIP EXTENDING HORIZONTALLY OVER IT

[75] Inventors: Hans-Dieter Futschik, Gechingen; Norbert Weber, Bondorf, both of Germany

[73] Assignee: Daimler-Benz Aktiengesellschaft, Stuttgart, Germany

[21] Appl. No.: 09/095,509

[22] Filed: Jun. 11, 1998

[30] Foreign Application Priority Data

Jun. 11, 1997 [DE] Germany ............... 197 24 600

[51] Int. Cl.⁶ ....................... B62O 25/14
[52] U.S. Cl. ............... 296/70; 296/72; 296/39.1; 180/90
[58] Field of Search ............... 296/70, 72, 39.1; 180/90

[56] References Cited

U.S. PATENT DOCUMENTS

| | | | |
|---|---|---|---|
| 2,818,933 | 1/1958 | Tell | 296/70 |
| 4,474,391 | 10/1984 | Matsuno et al. | 180/90 |
| 4,530,517 | 7/1985 | Miyabayashi et al. | 180/90 |
| 4,662,649 | 5/1987 | Ikeda et al. | 180/90 |
| 4,663,210 | 5/1987 | Schreiber et al. | 296/70 |
| 4,934,736 | 6/1990 | Huisman | 180/90 |
| 4,943,107 | 7/1990 | Rhides et al. | 296/70 |
| 5,387,023 | 2/1995 | Deneau | 296/72 |
| 5,419,606 | 5/1995 | Hull et al. | 296/39.1 |
| 5,556,153 | 9/1996 | Kelman et al. | 180/90 |
| 5,580,122 | 12/1996 | Muehlhausen | 296/70 |
| 5,709,358 | 1/1998 | Kubota | 296/70 |

FOREIGN PATENT DOCUMENTS

| | | |
|---|---|---|
| 33 36 934 | 5/1985 | Germany. |
| 59-89273 | 5/1984 | Japan. |
| 2 150 087 | 6/1985 | United Kingdom. |

Primary Examiner—Joseph D. Pape
Assistant Examiner—Kiran Patel
Attorney, Agent, or Firm—Evenson, McKeown, Edwards & Lenahan, PLLC

[57] ABSTRACT

A motor vehicle instrument panel has a basic body and a trim strip which is fastened to it and extends horizontally and is visible from the vehicle occupant compartment. The trim strip is constructed in a stable manner with a low weight. For this purpose, the trim strip is constructed as a reinforcing support and covers the whole width of the basic body of the instrument panel, in which case this reinforcing support can additionally form-lockingly reach around the lateral ends of the basic body.

12 Claims, 2 Drawing Sheets

MOTOR VEHICLE INSTRUMENT PANEL HAVING A TRIM STRIP EXTENDING HORIZONTALLY OVER IT

BACKGROUND AND SUMMARY OF THE INVENTION

This application claims the priority of German Application No. 197 24 600.1, filed Jun. 11, 1997, the disclosure of which is expressly incorporated by reference herein.

The invention relates to a motor vehicle instrument panel having a trim strip and, more particularly, to a motor vehicle instrument panel having a basic body and a trim strip which is fastened to it and extends horizontally and can be seen from the vehicle occupant compartment.

An instrument panel of this type is known, for example, from German Patent Document DE 33 36 934 C2. There, the trim strip is placed in a horizontally extending recess within the basic body of the instrument panel. It does not extend there in one piece over the whole width of the instrument panel. In contrast, it is, on the one hand, interrupted in the area of the steering column and does not extend, on the other hand, to the respective outermost horizontal ends of the instrument panel.

The invention relates to the problem of constructing an instrument panel provided with a horizontally arranged trim strip in a stable manner while its weight and expenditures of material are as low as possible, in which case it should be possible to use a basic body which obtains a sufficient stability only by means of add-on pieces and its fastening within the vehicle body.

A trim strip according to the present invention contributes to the solution of this problem. The trim strip is mounted on the basic body of the instrument panel. The trim strip is constructed as a reinforcing support which covers the whole width of the basic body of the instrument panel, reaching form-lockingly around its ends. The reinforcing support consists of a basic aluminum part with a surface layer which is applied to it and is constructed as a wood veneer or a plastic coating. In a manner distributed along its length, the reinforcing support is clamped and/or screwed several times to the basic body of the instrument panel. Openings for receiving instruments and/or instrument indicators are provided in the reinforcing support.

Other objects, advantages and novel features of the present invention will become apparent from the following detailed description of the invention when considered in conjunction with the accompanying drawings.

DETAILED DESCRIPTION OF THE DRAWINGS

Figure 3:
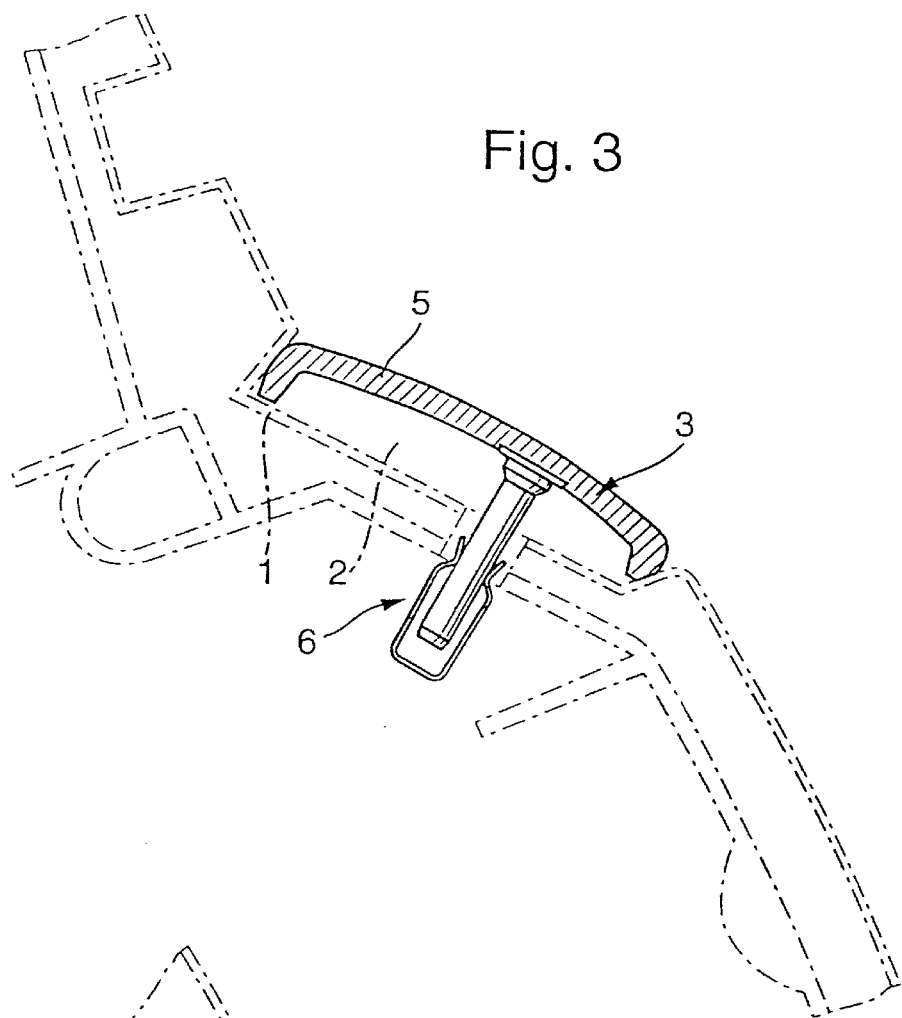
FIG. 3 is a sectional view of the trim strip according to Line III—III in FIG. 2 with an area of the instrument panel basic body indicated by a dash-dotted line.
Figure 4:
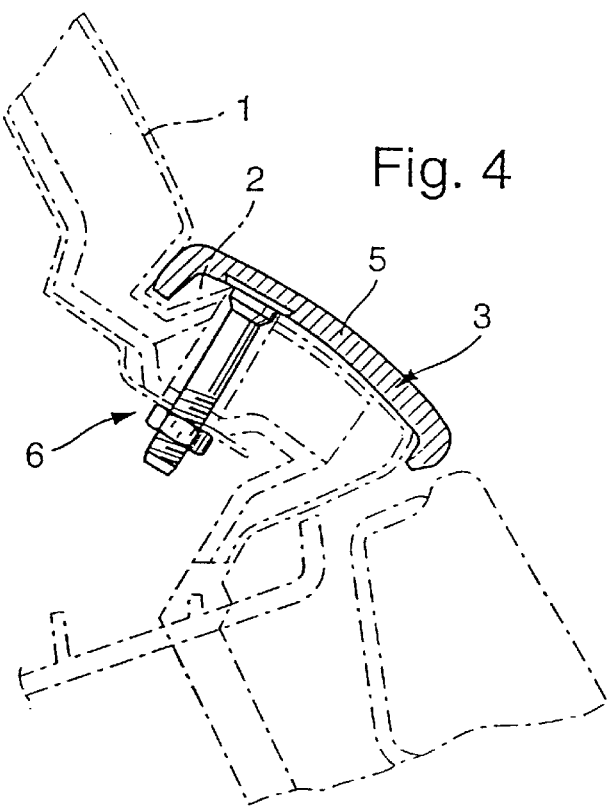
FIG. 4 is a sectional view of a trim strip according to Line IV—IV in FIG. 2 with an area of the instrument panel basic body indicated by a dash-dotted line.

Referring to the Figures, a basic body 1 made, for example, of plastic or sheet metal material—only partially indicated in the sectional views of drawing FIGS. 3 and 4—forms the instrument panel of a motor vehicle. A reinforcing support 3, which operates as a trim strip, is fastened in a recess 2 of the basic body 1 extending along the whole width of the instrument panel.

The reinforcing support 3 also extends along the whole width of the basic body 1 and can in each case reach around its lateral ends in a form-locking manner by means of webs bent by approximately 90°. In the cross-sectional view of FIGS. 3 and 4, the reinforcing support 3 has an approximately U-shaped construction. It consists of a basic aluminum part 4 onto which a wood veneer 10 can be glued on the surface visible toward the vehicle occupant compartment.

Figure 1:
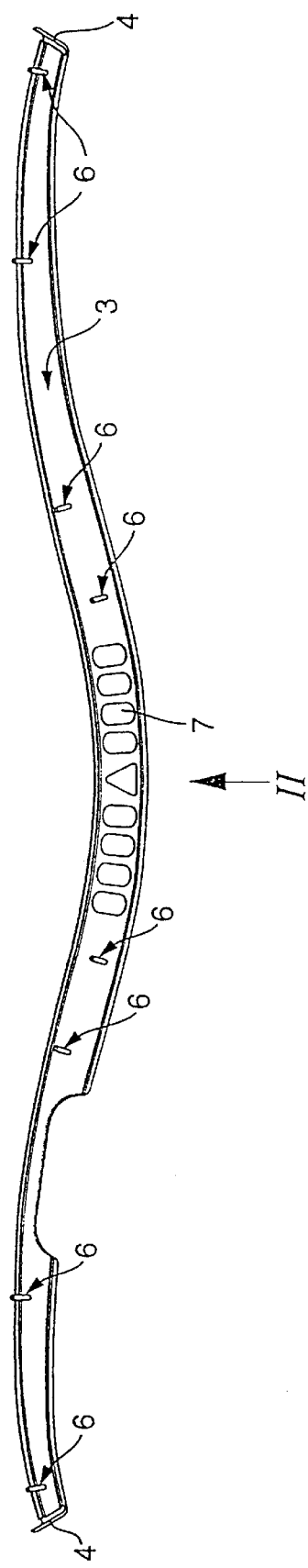
FIG. 1 is a view of a trim strip extending along the whole width of an instrument panel of a motor vehicle.
Figure 2:
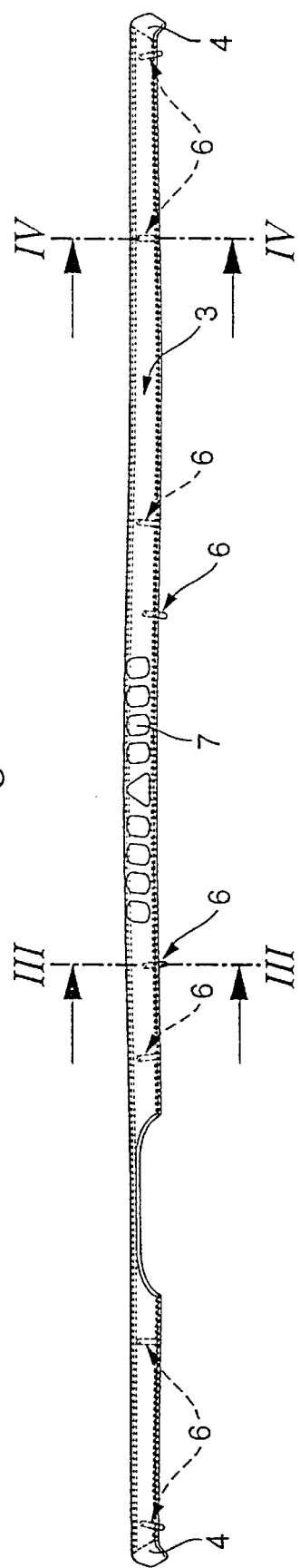
FIG. 2 is a view of the trim strip in the direction of the arrow II in FIG. 1.

The surface of the reinforcing support 3 serving as the trim strip which is visible in FIG. 2 faces the vehicle occupant interior, while the surface illustrated in FIG. 1 shows the rear or underside.

The reinforcing support 3 is partially clipped (fastening device 6 in FIG. 3) and partially screwed (fastening device 6 in FIG. 4) to the basic body 1 of the instrument panel. The portion of the fastening device 6 which is in each case situated on the reinforcing support 3 is a bolt which is riveted to the reinforcing support 3.

In the longitudinal center part of the reinforcing support 3, a field with side-by-side openings 7 is situated. The openings 7 are used for receiving instruments and instrument indicators. In this area, the reinforcing support 3 can be strengthened by means of a frame 12 which is linked to it and which simultaneously serves as the support for the instruments to be mounted. For achieving a good reinforcing effect, the reinforcing frame 12 is connected, particularly in a form-locking manner with the reinforcing support 3 by way of, for example, a dovetail joint.

FIGS. 1 and 2 show the positions of the fastening devices 6 outside the field with the openings 7. In the area of the reinforcing support 3 with the openings 7, the connection with respect to the basic body 1 takes place by way of fastening devices on the above-mentioned reinforcing frame connected with the reinforcing support 3.

In the above-described manner, the reinforcing support 3 is connected several times along the whole width of the instrument panel with its basic body 1 and therefore exercises a reinforcing function with respect to the basic body.

The particular advantage of the invention is the fact that the trim strip constructed as the reinforcing support 3 in connection with the basic body 1 of the instrument panel, strengthens the instrument panel as a whole in an excellent manner. As a result, the basic body 1 of the instrument panel can be constructed to be thin-walled such that, by itself, it is in an insufficiently stable condition. The basic body 1 may therefore have a low-weight construction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle instrument panel, comprising:
   a basic body;
   a reinforcing support fastened to the basic body and extending horizontally, said reinforcing support being visible from a vehicle occupant compartment;
   wherein said reinforcing support covers a whole width of the basic body of the instrument panel, and reaches around lateral ends of the basic body;

further wherein the reinforcing support comprises a basic aluminum part and a surface layer applied to the basic aluminum part;

a plurality of fasteners distributed along a length of the reinforcing support for fastening the reinforcing support at several locations to the basic body of the instrument panel; and wherein openings are provided in the reinforcing support, said openings being adapted to receive instrument components.

2. The motor vehicle instrument panel according to claim 1, wherein said surface layer is one of a wood-veneer and plastic coating.

3. The motor vehicle instrument panel according to claim 1, wherein the plurality of fasteners comprise at a least one of clamps and screws.

4. The motor vehicle instrument panel according to claim 1, wherein the plurality of fasteners are shaped-on fastening devices provided on a rearward side of the reinforcing support facing away from the vehicle occupant compartment, said shaped-on fastening devices engaging in complementarily constructed fastening devices on the basic body of the motor vehicle instrument panel.

5. The motor vehicle instrument panel according to claim 4, wherein the fastening devices extending from the reinforcing support are constructed in a pin-shape and are riveted on the reinforcing support.

6. The motor vehicle instrument panel according to claim 1, wherein the reinforcing support has a U-shaped cross-section, the legs of said U-shaped cross-section facing the basic body of the instrument panel.

7. The motor vehicle instrument panel according to claim 4, wherein the reinforcing support has a U-shaped cross-section, the legs of said U-shaped cross-section facing the basic body of the instrument panel.

8. The motor vehicle instrument panel according to claim 5, wherein the reinforcing support has a U-shaped cross-section, the legs of said U-shaped cross-section facing the basic body of the instrument panel.

9. The motor vehicle instrument panel according to claim 1, wherein the openings for receiving the instrument components are provided in an area in which several of said openings adjoin one another along the reinforcing support, the instrument panel further comprising a reinforcing frame by which the reinforcing support is connected with the basic body in the area, said reinforcing frame reinforcing the reinforcing support in the area.

10. The motor vehicle instrument panel according to claim 4, wherein the openings for receiving the instrument components are provided in an area in which several of said openings adjoin one another along the reinforcing support, the instrument panel further comprising a reinforcing frame by which the reinforcing support is connected with the basic body in the area, said reinforcing frame reinforcing the reinforcing support in the area.

11. The motor vehicle instrument panel according to claim 5, wherein the openings for receiving the instrument components are provided in an area in which several of said openings adjoin one another along the reinforcing support, the instrument panel further comprising a reinforcing frame by which the reinforcing support is connected with the basic body in the area, said reinforcing frame reinforcing the reinforcing support in the area.

12. The motor vehicle instrument panel according to claim 6, wherein the openings for receiving the instrument components are provided in an area in which several of said openings adjoin one another along the reinforcing support, the instrument panel further comprising a reinforcing frame by which the reinforcing support is connected with the basic body in the area, said reinforcing frame reinforcing the reinforcing support in the area.

\* \* \* \* \*